US007040097B2

(12) United States Patent
Mukherjee

(10) Patent No.: US 7,040,097 B2
(45) Date of Patent: May 9, 2006

(54) GAS TURBINE AND ASSOCIATED COOLING METHOD

(75) Inventor: Dilip Mukherjee, Fislisbach (CH)

(73) Assignee: ALSTOM Technology Ltd., Baden (CH)

( * ) Notice: Subject to any disclaimer, the term of this patent is extended or adjusted under 35 U.S.C. 154(b) by 0 days.

(21) Appl. No.: 10/912,119

(22) Filed: Aug. 6, 2004

(65) Prior Publication Data

US 2005/0172634 A1 Aug. 11, 2005

(30) Foreign Application Priority Data

Aug. 8, 2003 (DE) ................................ 103 36 432

(51) Int. Cl.
*F02C 7/16* (2006.01)

(52) U.S. Cl. .......................................... 60/775; 60/806

(58) Field of Classification Search .................. 60/806, 60/772, 775, 752; 415/115; 416/97 R, 96 R See application file for complete search history.

(56) References Cited

U.S. PATENT DOCUMENTS

| | | | | |
|---|---|---|---|---|
| 4,314,442 | A * | 2/1982 | Rice | 60/775 |
| 4,565,490 | A * | 1/1986 | Rice | 415/114 |
| 5,253,976 | A * | 10/1993 | Cunha | 415/114 |
| 5,340,274 | A * | 8/1994 | Cunha | 415/115 |
| 6,079,946 | A * | 6/2000 | Suenaga et al. | 416/97 R |
| 6,142,730 | A * | 11/2000 | Tomita et al. | 415/115 |

FOREIGN PATENT DOCUMENTS

| | | |
|---|---|---|
| DE | 30 03 347 A1 | 6/1981 |

* cited by examiner

*Primary Examiner*—Ehud Gartenberg
(74) *Attorney, Agent, or Firm*—Cermak & Kenealy, LLP; Adam J. Cermak

(57) ABSTRACT

A gas turbine (1), in particular in a power plant, has at least one combustion chamber (2) and an enclosed inner liner (3) which surrounds the combustion chamber (2) and an enclosed outer liner (4), having a stator (5) which has at least one vane row (6) with a plurality of vanes (7), a rotor (8) which has at least one blade row (9) with a plurality of blades (10), an air cooling arrangement (31) which is designed for cooling parts of the gas turbine (1) with air (L), and a steam cooling arrangement (32) which is designed for cooling parts of the gas turbine (1) with steam (D).

11 Claims, 2 Drawing Sheets

GAS TURBINE AND ASSOCIATED COOLING METHOD

This application claims priority under 35 U.S.C. § 119 to German application number 103 36 432.3, filed 08 Aug. 2003, the entirety of which is incorporated by reference herein.

BACKGROUND OF THE INVENTION

1. Field of the Invention

The present invention relates to a gas turbine, in particular in a power plant. The invention also relates to an associated method of cooling the gas turbine.

2. Brief Description of the Related Art

A large portion of the requisite electrical energy is generated in power plants by means of steam and/or gas turbines. The efficiency of these plants is crucially determined by the inlet temperature of the working medium (gas or steam). If higher efficiencies are to be realized, higher temperatures must be adopted. Due to these temperature increases, however, the limit of the material stress is reached very quickly. Intensified cooling of the steam and/or gas turbine is therefore required in order to increase the efficiency. The conventional cooling medium of the hot-gas-carrying components in a gas turbine is air, extracted from the final or intermediate stage of the compressor. Critical locations in this case are the combustion chamber lining, the first vane row, the first blade row, the turbine rotor and the rear compressor section. In general, however, the cooling of steam or gas turbines by means of steam is also known (DE 3003347). On account of its higher thermal capacity and its lower viscosity, steam is in principle a better cooling medium than air. In addition, steam, instead of cooling air, reduces the specific compressor output due to the omission of the pressure losses of the cooling air and reduces the NOx emissions due to a lower combustion chamber temperature at the same turbine inlet temperature.

The steam cooling may be designed as an open or closed system. In an open system (e.g. film cooling of the blades), the steam, once it has fulfilled its cooling task, is admixed with the working gas and thereby acts on the gas turbine in such a way as to increase the output and efficiency.

SUMMARY OF THE INVENTION

The present invention deals with the problem of specifying an improved embodiment for a gas turbine of the type mentioned at the beginning, with which embodiment in particular a higher output and a prolonged service life of the critical components can be achieved.

The invention is based on the general idea of additionally providing a steam cooling arrangement in a gas turbine which is designed with a conventional air cooling arrangement for cooling parts of the gas turbine by means of air, this steam cooling arrangement being designed for cooling parts of the gas turbine by means of steam.

For example, a rotor and a stator of the gas turbine are cooled with air in a conventional manner, whereas a small steam quantity additionally flows, for example, from the inlet into the turbine up to the outlet from the turbine along a rotor lateral surface parallel to the hot gas flow. On account of its higher thermal capacity and its lower viscosity, steam is in principle a better cooling medium than air. In addition, steam, instead of cooling air, reduces the requisite cooling medium quantity by about 50%.

The essential advantage of the invention consists in the fact that the output of the gas turbine additionally cooled with steam increases by about 2 to 5% compared with the conventional air-cooled gas turbine. This results from the higher turbine inlet temperature, which leads to a higher output. In addition, it is remarkable that only a comparatively small, specifically applied steam quantity is required in order to achieve together with the air cooling intensive cooling of the gas turbine.

According to a preferred embodiment of the solution according to the invention, provision may be made for the steam cooling arrangement to be designed at least for cooling the enclosed inner liner and/or the enclosed outer liner of the combustion chamber and/or the vanes and/or hub-side cover elements of the vanes, and/or for a steam guide to be designed in such a way that a steam film is produced downstream of the vane row along the rotor lateral surface.

This steam film protects the rotor from contact with the hot gas flow and thereby leads to a prolonged service life of the critical components of the gas turbine.

In accordance with a preferred embodiment of the invention, the steam cooling arrangement may be designed for cooling a leading region of the vanes, and the air cooling arrangement may be designed for cooling a trailing region of the vanes. This offers the advantage that the vanes are cooled intensively with steam in the leading region, which is subjected to a relatively high thermal loading. In this case, the invention utilizes the knowledge that the air cooling is sufficient for cooling the trailing region, which is not so highly loaded thermally, as a result of which sufficient blade cooling is achieved with comparatively little energy. Provided the steam blown in for the cooling issues from the outlet openings again into the hot gas flow, it produces a fine steam layer on the outer skin of the respective vane, which steam layer settles over the vanes and protects the latter, in a similar manner to the rotor lateral surface in the manner described above, from direct contact with the hot gas flow and thus contributes to the robustness of the gas turbine.

The steam required for the steam cooling arrangement can advantageously be extracted from a heat recovery boiler of a steam turbine which is coupled to the gas turbine. The steam cooling therefore requires no additional steam generator.

Further important features and advantages of the present invention follow from the drawings and the associated description of the figures with reference to the drawings.

BRIEF DESCRIPTION OF THE DRAWINGS

Preferred exemplary embodiments of the invention are shown in the drawings and are explained in more detail in the description below, the same designations referring to the same or similar or functionally identical features.

In the drawing, in each case schematically.

DETAILED DESCRIPTION OF THE PREFERRED EMBODIMENTS

Figure 1:
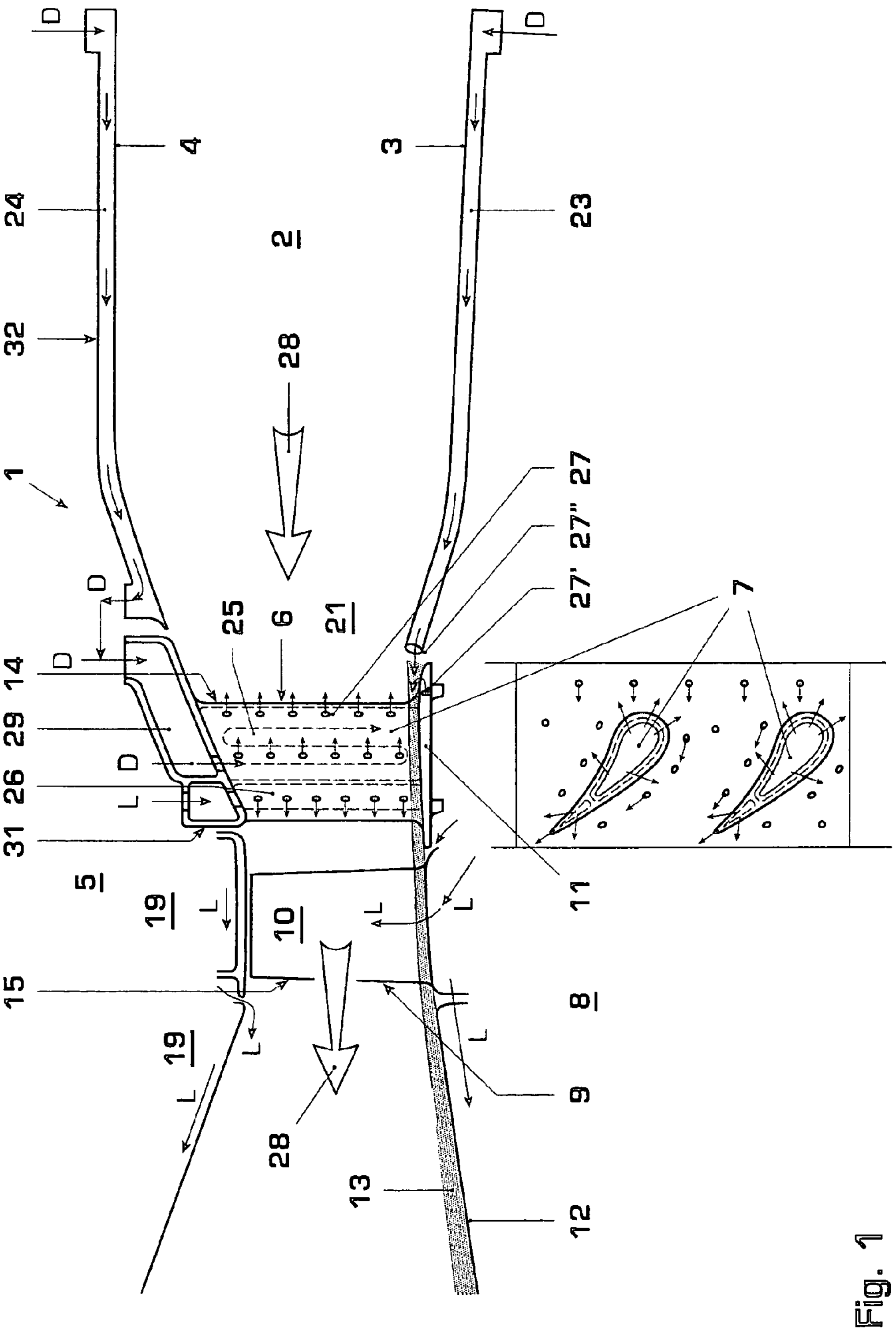
FIG. 1 shows a longitudinal section through a gas turbine according to the invention.

In accordance with FIG. 1, a gas turbine 1 according to the invention comprises a combustion chamber 2 (burners not shown), a stator 5, a rotor 8 and also an only partly illustrated air cooling arrangement 31 and a likewise only partly illustrated steam cooling arrangement 32. The combustion chamber 2 is surrounded by an enclosed inner liner 3 and an enclosed outer liner 4. In the direction of flow downstream of the combustion chamber 2, a hot gas flow 28 heated in the combustion chamber 2 strikes at least one vane row 6 having a plurality of vanes 7 which in each case have a leading region 14 and a trailing region 15. Following said vane row 6 is a blade row 9 having a plurality of blades 10, which form part of the rotor 8.

According to FIG. 1, the steam cooling arrangement 32 comprises a first cooling passage 24 which is arranged in the enclosed outer liner and through which steam D flows during operation of the steam cooling arrangement 32. At the end, the first cooling passage 24 communicates via an outer shroud plate 29 with a third cooling passage 25 which is integrated in the vane 7. The third cooling passage 25 is arranged in the leading region 14 of the vane 7 and has outlet openings 27, which are connected on the outside of the respective vane 7 to the hot gas flow 28. At the end, the third cooling passage 25 communicates with hub-side cover elements 11, so that the remaining steam D which has not discharged through the outlet openings 27 flows into the hub-side cover elements 11 and likewise cools the latter. In a similar manner to the outlet openings 27 at the leading region 14 of the vane 7, outlet openings 27' are provided on the hub-side cover elements 11, the steam D issuing from said outlet openings 27' in the region of an inlet 21 into the gas turbine 1. The aim here is for most of the steam D to issue through the outlet openings 27'.

Furthermore, a second cooling passage 23 is arranged in the enclosed inner liner 3 and runs essentially parallel to the hot gas flow 28 in the direction of the vanes 7. At the end, the second cooling passage 23 communicates with the hot gas flow 28 at the inlet of the gas turbine 1 via outlet openings 27" which are arranged in the region of the hub-side cover elements 11.

The steam D required for the steam cooling arrangement 32 can be advantageously extracted from steam generators (not shown), in particular from a heat recovery boiler, a startup steam generator or a steam turbine which is coupled to the gas turbine. An additional steam generator is therefore not required for the steam cooling.

According to FIG. 1, the air cooling arrangement 31 comprises a fourth cooling passage 26 which is integrated in the vanes 7 in the trailing region 15. The cooling passage 26 is connected on the inlet side to a cooling air source (not shown), for example a final or intermediate stage of a compressor, and can communicate on the outlet side with the hot gas flow 28 or an interior of the gas turbine 1 via outlet openings 27'". In contrast to the first, second and third cooling passages 24, 23, 25 and the hub-side cover elements 11, the fourth cooling passage 26 has air L flowing through it and is cooled by the latter.

The blade row 9 having a plurality of blades 10 is arranged downstream of the vane row 6. As in conventional gas turbines 1, the blades 10 are cooled with air L, which in the embodiment shown flows into the blades 10 on the rotor side.

According to the embodiment shown, the air cooling arrangement 31 is designed for cooling both the blades 10 and heat accumulation elements 19 arranged downstream of the vanes 7. In this case, the heat accumulation elements 19 are cooled by cooling that side of the heat accumulation elements 19 which is remote from the hot gas flow 28. Additionally or alternatively, air L, according to FIG. 1, can be blown into the gas turbine 1 directly downstream of the blades 10 and can thus effect and/or enhance cooling of the heat accumulation elements 19 on the side facing the hot gas flow 28 and the rotor lateral surface 12, respectively.

The functioning of the combined air/steam cooling of the gas turbine 1 according to the invention is to be briefly explained below:

The conventional cooling medium of hot-gas-carrying components in a gas turbine 1 is air L which is extracted from a final or intermediate stage of a compressor (not shown). Critical locations in this case are the enclosed inner liner 3 and the enclosed outer liner 4 of the combustion chamber 2, the first vane row 6, the first blade row 9 and the turbine rotor 8.

In order to increase the turbine output and prolong the service life of the gas turbine 1, the invention proposes combined cooling by means of steam D and air L.

The preferably slightly superheated steam D of the steam cooling arrangement 32 flows into cooling passages 23, provided for this purpose, of the enclosed inner liner 3 and cooling passages 24 of the enclosed outer liner 4 from the burner side.

The steam D which has flowed in issues from the first cooling passage 24 at the end of the latter and is then passed on via a guide-blade outer shroud plate 29 into an adjoining third cooling passage 25. After the outer shroud plate 29 and the leading region 14 of the vane 7 have been cooled, the steam D flows into the hub-side cover plate 11 of the vane 7 and via outlet openings 27' into the gas turbine 1. At the same time, the steam D flows via outlet openings 27 in the leading region 14 of the vanes 7 into the gas turbine 1. The aim in this case is for most of the steam D to issue at the hub.

A further steam flow D is fed to the inner liner 3 at the burner side and flows through cooling passages 23 of the inner liner 3 parallel to the hot gas flow 28 up to the outlet opening 27" in the region of the hub-side cover elements 11. The two steam flows D of the inner liner 3 and of the hub-side cover plate 11, on account of the higher density of the steam D relative to the hot gas flow 28, during the expansion along the turbine 1 downstream of the vanes 7, form a steam veil or film 13 of a certain flow thickness along the rotor lateral surface 12 and respectively at the margin of the hot gas flow 28. This steam film 13 protects the rotor 8 from contact with the hot gas flow 28 and thereby leads to a prolonged service life of the critical components of the gas turbine 1.

The enclosed inner liner 3 and the enclosed outer liner 4 are cooled with steam D. The steam quantity required for this is about 50% of the cooling air quantity. The slightly superheated steam D required for the cooling is preferably extracted from a heat recovery boiler (not shown). In this case, provision may be made for both the first cooling passage 24 and the second cooling passage 23 to be fed from a common heat recovery boiler or from separate heat recovery boilers.

The output of the gas turbine 1 operated with the combined air and steam cooling increases by about 2 to 5 percent compared with the conventional air-cooled gas turbine, a factor which, in the case of a combined gas-turbine/steam-turbine plant, can be explained as follows: the steam turbine output decreases slightly as a result of the extraction of the slightly superheated steam D from the heat recovery boiler, whereas the thermal output of the heat recovery boiler increases as a result of the greater quantity from the gas turbine. Most of this output is therefore more or less recovered in the gas turbine 1 as a result of the expansion of the steam after the cooling of the inner liners 3, 4 and the vanes 7 at a substantially higher temperature and at up to 1 bar. The saved cooling air quantity of the vanes 7 flows through the combustion chamber 2 and participates in the combustion process, as a result of which increased output of the gas turbine 1 is achieved.

Figure 2:
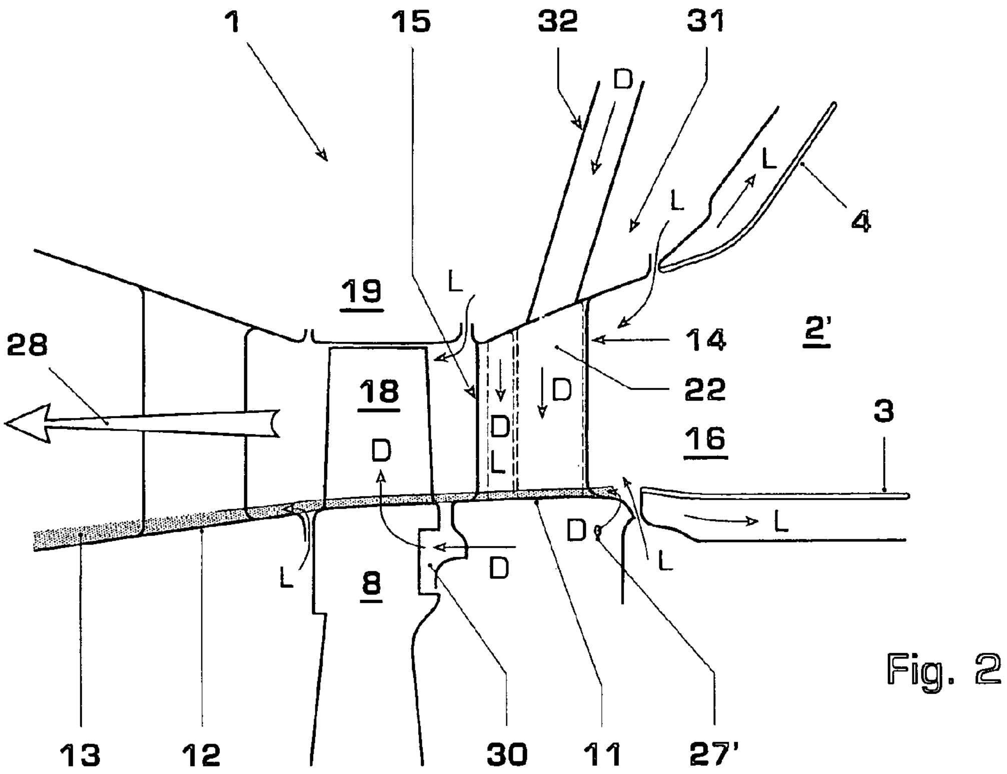
FIG. 2 shows an illustration as in FIG. 1 but in another embodiment.

In accordance with FIG. 2, the gas turbine 1 is shown in another embodiment which is designed for carrying out sequential combustion. A high-pressure combustion chamber 2' and a high-pressure vane row 22 having a plurality of high-pressure vanes 16 and at least one high-pressure blade row 17 having a plurality of high-pressure blades 18 are provided for this purpose and are followed downstream by a low-pressure combustion chamber (not shown) and a low-pressure turbine.

In this case, the high-pressure blades 18 and the high-pressure vanes 16 are cooled with steam D at least in their leading region, whereas the trailing edges of the high-pressure vanes 16 can either also be cooled with steam or else in a conventional manner with air. The various cooling passages are in this case designed in such a way that a certain steam quantity flows through the high-pressure vanes 16 into the hub-side cover elements 11. A large portion of the steam D then flows in a similar manner as in FIG. 1 via outlet openings 27' into the gas turbine 1. The other portion of the steam D flows into an intermediate space 30 which is arranged below the rotor lateral surface 12 and between the high-pressure vanes 16 and the high-pressure blades 18 in order to be drawn in from there by the high-pressure blades 18 for the cooling. At the same time, a portion of the steam D blocks the described intermediate space 30 between high-pressure vanes and high-pressure blades 16, 18 with a certain quantity of blown-out steam D. The remaining components are air-cooled.

Also in the gas turbine 1 shown in FIG. 2 and having sequential combustion, the steam D which has come out through the outlet openings 27' produces a steam film 13 which settles around the rotor lateral surface 12 and protects the latter from direct contact with the hot gas flow 28.

Figure 3:
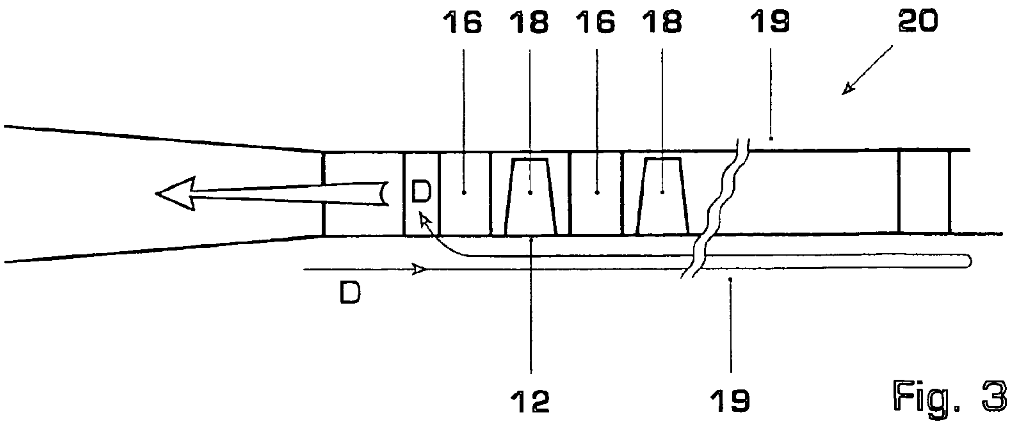
FIG. 3 shows a longitudinal section through a high-pressure compressor.

An embodiment variant for cooling a high-pressure compressor 20 is shown according to FIG. 3. In this case, suitable heat accumulation elements 19 are arranged between the high-pressure vanes 16 and the high-pressure blades 18 at the rotor lateral surface 12 and are cooled with slightly superheated steam D which is fed in at the end of the high-pressure compressor 20 and is returned again after a certain distance at the end of the high-pressure compressor 20.

In summary, the essential features of the solution according to the invention can be characterized as follows:

The invention provides for a steam cooling arrangement 32 to be additionally provided in a gas turbine 1 which is designed with a conventional air cooling arrangement 31 for cooling parts of the gas turbine 1 by means of air, this steam cooling arrangement 32 being designed for cooling parts of the gas turbine 1 by means of steam.

The rotor 8 and the stator 5 are cooled with air L in a conventional manner. In addition, a small steam quantity now flows from the inlet 21 into the gas turbine 1 up to the outlet from the gas turbine 1 along the rotor lateral surface 12 parallel to the hot gas flow 28. As a result, on account of the higher density of the steam D relative to the hot gas flow 28, a steam film 13 remains on the rotor lateral surface 12 and protects the latter from direct contact with the hot gas flow 28.

The advantages of the invention consist in the fact that the output of the gas turbine 1 additionally cooled with steam D increases, for example, by about 2 to 5% compared with the conventional air-cooled gas turbine 1 and at the same time a prolonged service life of the critical components can be achieved on account of the steam film 13.

LIST OF DESIGNATIONS

1 Gas turbine
2 Combustion chamber
3 Enclosed inner liner
4 Enclosed outer liner
5 Stator
6 Vane row
7 Vane
8 Rotor
9 Blade row
10 Blade
11 Hub-side cover elements
12 Rotor lateral surface
13 Steam film
14 Leading region
15 Trailing region
16 High-pressure vane
17 High-pressure blade row
18 High-pressure blade
19 Heat accumulation elements
20 High-pressure compressor
21 Inlet
22 High-pressure vane row
23 Second cooling passage
24 First cooling passage
25 Third cooling passage
26 Fourth cooling passage
27 Outlet opening
28 Hot gas flow
29 Outer shroud plate
30 Intermediate space
31 Air cooling arrangement
32 Steam cooling arrangement
D Steam
L Air While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A gas turbine comprising:

at least one combustion chamber, an enclosed inner liner which surrounds the combustion chamber, and an enclosed outer liner;

a stator having at least one vane row with a plurality of vanes;

a rotor having at least one blade row with a plurality of blades;

an air cooling arrangement configured and arranged to cool parts of the gas turbine with air; and a steam cooling arrangement configured and arranged to cool parts of the gas turbine by steam, simultaneously with said air cooling arrangement;

wherein the vanes comprise hub-side cover elements, and the steam cooling arrangement is configured and arranged at least for cooling the enclosed inner liner, the enclosed outer liner, the vanes, the hub-side cover elements of the vanes, or combinations thereof;

further comprising a steam guide configured and arranged at the downstream end of said enclosed inner liner so that a steam film is produced downstream of the vane row, along a rotor lateral surface;

or both.

2. The gas turbine as claimed in claim 1, further comprising:

heat accumulation elements arranged downstream of the vane row; and wherein the air cooling arrangement is configured and arranged at least for cooling the blades, the heat accumulation elements, or both.

3. The gas turbine as claimed in claim 1, wherein the steam cooling arrangement is configured and arranged for cooling the vanes in a leading region, and the air cooling arrangement is designed for cooling the vanes in a trailing region.

4. The gas turbine as claimed in claim 1, further comprising:

means for carrying out sequential combustion;

a high-pressure combustion chamber with an enclosed inner liner which surrounds the high-pressure combustion chamber, and an enclosed outer liner;

at least one high-pressure vane row having a plurality of high-pressure vanes; and at least one high-pressure blade row having a plurality of high-pressure blades.

5. The gas turbine as claimed in claim 4:

wherein the high-pressure vanes comprise hub-side cover elements, and the steam cooling arrangement is configured and arranged at least for cooling the high-pressure vanes, the hub-side cover elements of the high-pressure vanes, the high-pressure blades, or combinations thereof;

further comprising a steam guide configured and arranged so that a steam film is produced downstream of the high-pressure vane row along a rotor lateral surface;

or both.

6. The gas turbine as claimed in claim 4, further comprising:

heat accumulation elements arranged downstream of the high-pressure vane row; and wherein the air cooling arrangement is configured and arranged at least for cooling the enclosed inner liner of the high-pressure combustion chamber, the enclosed outer liner of the high-pressure combustion chamber, the trailing edge of the high-pressure vanes, the heat accumulation elements arranged downstream of the high-pressure vane row, or combinations thereof.

7. The gas turbine as claimed in claim 4, further comprising:

a high-pressure compressor; and wherein the steam cooling arrangement is configured and arranged at least for partly cooling the high-pressure compressor.

8. The gas turbine as claimed in claim 4, further comprising:

a steam turbine including a heat recovery boiler, the steam turbine being coupled to the gas turbine; and wherein the steam cooling arrangement is connected to the heat recovery boiler, for the extraction of steam.

9. A method of cooling a gas turbine, the gas turbine including:

a combustion chamber having an enclosed inner liner which surrounds the combustion chamber, and an enclosed outer liner, a stator which has at least one vane row with a plurality of vanes, and a rotor which has at least one blade row with a plurality of blades, wherein the vanes comprise hub-side cover elements, and the steam cooling arrangement is configured and arranged at least for cooling the enclosed inner liner, the enclosed outer liner, the vanes, the hub-side cover elements of the vanes, or combinations thereof, further comprising a steam guide configured and arranged at the downstream end of said enclosed inner liner so that a steam film is produced downstream of the vane row, along a rotor lateral surface;

or both, the method comprising: cooling parts of the gas turbine with air with an air cooling arrangement; and simultaneously cooling other parts of the gas turbine with steam with a steam cooling arrangement.

10. A power plant comprising a gas turbine as claimed in claim 1.

11. The method as claimed in claim 9, wherein the gas turbine is in a power plant.

* * * * *